United States Patent [19]

King, III et al.

[11] 3,902,329

[45] Sept. 2, 1975

[54] DISTILLATION OF METHANE AND HYDROGEN FROM ETHYLENE

[75] Inventors: Cary Judson King, III, Kensington; Francisco Jose Barnes, Albany, both of Calif.

[73] Assignee: The Regents of the University of California, Berkeley, Calif.

[22] Filed: Oct. 28, 1970

[21] Appl. No.: 84,584

[52] U.S. Cl. .......................................... 62/17; 62/28
[51] Int. Cl.² ............................................. F25J 3/00
[58] Field of Search ............... 62/17, 20, 23, 24, 27, 62/28, 29

[56] References Cited
UNITED STATES PATENTS

| | | | |
|---|---|---|---|
| 2,321,666 | 6/1943 | Felbeck | 62/17 |
| 2,577,617 | 12/1951 | Hudig | 62/23 |
| 2,775,103 | 12/1956 | Koble | 62/17 |
| 2,777,305 | 1/1957 | Davison | 62/17 |
| 2,933,901 | 4/1960 | Davison | 62/28 |
| 3,192,732 | 7/1965 | Cahn | 62/17 |
| 3,197,970 | 8/1965 | Nelson | 62/17 |
| 3,262,278 | 7/1966 | Thorsten | 62/20 |
| 3,444,696 | 5/1969 | Geddes | 62/28 |

Primary Examiner—Norman Yudkoff
Assistant Examiner—Frank Sever
Attorney, Agent, or Firm—Stanley Bialos; Donovan J. DeWitt

[57] ABSTRACT

An ethylene-containing stream from an ethylene manufacturing plant is sent through a demethanization distillation column which is supplied at an upper plate level, below the top plate, with a condensate stream refrigerated to about −150°. The condensate so added can be an intermediate reflux stream or a hydrocarbon recycle stream boiling above ethylene, e.g. propane-propylene, as obtained from another separation column in the ethylene recovery system. The added condensate has the effect of reducing both the overhead ethylene loss as well as the amount of overhead reflux required. The overhead reflux can then be generated entirely from the refrigeration gained by expansion of the methane-hydrogen tail gas. Extremely low temperatures are thus generated in the last tail gas separator drum, and because of the very low equilibrium vapor pressure of ethylene at such temperatures, the amount of ethylene lost to the tail gas stream is still further reduced.

1 Claim, 2 Drawing Figures

INVENTORS
CARY JUDSON KING III
FRANCISCO J. BARNES
BY Stanley Bielee
ATTORNEY

DISTILLATION OF METHANE AND HYDROGEN FROM ETHYLENE

BACKGROUND OF THE INVENTION

In ethylene manufacturing plants it is necessary to separate by distillation the various hydrocarbons issuing from the reactor. The separation step which requires the most rigorous operating conditions is that of demethanization in which hydrogen and methane are separated from ethylene and other higher boiling hydrocarbons. The demethanizer column is run at high pressures, typically 400 to 550 psig, and refrigeration is used in the column overhead to condense out as much of the ethylene therefrom as is possible. The economics of the demethanization process are largely governed by the loss of product ethylene to the hydrogen-methane tail gas stream which commonly has no more than fuel value.

It is an object of this invention to provide a process whereby the ethylene content of the tail gas stream can economically be reduced in substantial measure, thereby contributing to the overall efficiency and profitability of the ethylene production facility. The nature of other objects of the invention will be apparent from a consideration of the drawing and of the descriptive portion to follow.

SUMMARY OF THE INVENTION

It has been discovered that the recovery of ethylene from the effluent of a reactor producing said gas can be greatly improved by conducting the demethanization step in a high pressure distillation column containing a relatively large number of plates to which a highly refrigerated stream of a hydrocarbon condensate is supplied near the top of the column, but below the top plate or its equivalent. The amount of condensate so employed is large enough to induce the condensation of a substantial proportion of the ethylene which would otherwise be vaporized and passed overhead with the hydrogen and methane, thereby reducing both the overhead ethylene loss as well as the amount of overhead reflux required. This condensate can be supplied either by way of intermediate recycle, wherein vapors are withdrawn at an intermediate point high in the column for refrigeration and return to the column as condensate adjacent the point of withdrawl, or by the use of a refrigerated stream of a hydrocarbon boiling above ethylene which is recycled to the demethanizer column from some other distillation column in the recovery system. In either case, the condensate, usually at a temperature of about −140° to −155°F. as provided by use of an external refrigerant such as liquid ethylene, establishes a temperature only slightly higher than that of the condensate in the zone of the column at which the condensate is introduced.

Typically the demethanization column is one containing from about 20 to 30 or more plates which is operated at high pressures such as about 400 to 550 psig or higher.

The hydrogen and methane introduced into the column are distilled overhead, along with a reduced amount of ethylene, and this overhead stream is then chilled and sent to a vapor-liquid separation drum from which the tail gas stream is withdrawn and reduced in pressure, thereby lowering the temperature of the stream to a level below −200°F., usually about −210° to −220°F. This stream is then passed in heat exchange relationship with the overhead vapor stream from the column to bring the contents of said separation drum to very low temperatures, frequently of the order of −160° to −180°F. Auxiliary refrigeration can also be employed to effect this cooling of the overhead stream, though it is an important feature of this invention that by introducing appropriate quantities of the refrigerated condensate into an upper portion of the column, as noted above, the overhead reflux can be generated entirely from the refrigeration gained by expansion of the tail gas.

The extremely cold condensate from the aforesaid separation drum is pumped back into the top of the column, thereby establishing a temperature which enables the overhead vapor leaving the column to reach temperatures which are colder than that provided at a lower point in the column where the refrigerated condensate is supplied to the column at a plate level down to about the eighth plate from the top, but not at the top plate or its equivalent. This cold temperature at which the overhead gases leave the column is thus a function both of the refrigerated condensate added below as well as of the extremely cold external recycle coming in at the top of the column.

Reference is made above to the fact that the highly refrigerated condensate stream of the present invention is introduced below the top plate of the demethanization column "or its equivalent". A column is regarded as having the equivalent of a top plate when (as shown in FIG. 2 of the drawing) the overhead from the column is chilled and sent to a first vapor-liquid separation drum from which the condensate is returned to the top of the column while the overhead from this drum is sent to a second vapor-liquid separation drum from which the tail gas stream is withdrawn for expansion-cooling and is used to bring the stream entering this second drum to the desired, very low temperatures. The condensate from the second drum is returned to the first drum. Here the first separation drum can be regarded as the equivalent of the top plate, or tray, of the column, and the refrigerated condensate can be added to the actual top plate of the column in this modification. Accordingly, in referring hereinafter and in the claims to the "top plate" of the column, it is meant to include not only the actual top plate of the column, but also an arrangement of this type wherein a first external vapor-liquid separate drum serves the function of a top plate in the column.

It will be noted that in the process of the present invention, the highly refrigerated condensate introduced near the top of the column serves in part to supplant reflux generated by the overhead condensor, thereby lessening the overhead reflux requirements. Both this lower reflux ratio and the colder temperature of the overhead vapor leaving the column serve to reduce ethylene loss to the tail gas stream. Further, with the temperature of the last tail gas separator drum being even lower than the temperatures at the top of the column (or its equivalent), the ethylene losses are still further reduced because of the very low equilibrium vapor pressure of ethylene at the temperatures prevailing in said separator drum.

Reference has been made above to the fact that in carrying out the practice of this invention a highly refrigerated hydrocarbon condensate is continuously introduced to the column near the top thereof, but below the level of the top plate. In a column containing from about 20 to 30 plates or more, the condensate is directed into the column at a level of from about the second to the eighth plate from the top, with a preferred introduction point for the condensate being at a level of about plates 3 through 6. It is also possible to supply the column with two or more such condensate streams at different plate levels within this defined upper zone.

The condensate supplied to the column can be obtained either by way of "intermediate reflux", i.e., by withdrawing upwardly passing vapors within the column at a level between the second and eighth plates, which vapors are then refrigerated and returned to the column, or it can be a "recycle condensate", i.e., a refrigerated condensate made up of a higher boiling hydrocarbon which is recycled from another column in the overall ethylene separation and recovery system. Representative hydrocarbons which can be employed in this fashion to provide the recycle condensate stream are ethane, propane, propylene, butane, butylene, or even pentane, though preferably the gas employed is made up of propane or a mixture of propane and propylene. Any such higher boiling stream is not lost to the system; it merely represents recycle recovered from a given column and returned directly or indirectly thereto by way of bottoms from the demethanization column.

When operating with either an intermediate reflux or a recycle condensate, the material to be introduced into the column is refrigerated with the coldest available external refrigerant. Normally this is liquid ethylene at a temperature of about $-145°$ to $-160°F$. When using intermediate reflux, the amount of vapor withdrawn from the column to supply the condensate is sufficiently large as to establish a temperature of about $-135°$ to $-150°F$. on the plate at which the condensate is returned to the column. Similarly, when operating by recycling a higher boiling condensate to the column, the stream is similarly refrigerated and is introduced into the column in an amount sufficient to establish liquid temperatures on the plate at this same $-135°$ to $-150°F$. level. The recycle condensate method has an advantage in that by increasing the flow of refrigerated liquid to the column, similar cold temperatures can also be established at one or more plate levels below the point at which the refrigerated condensate is brought into the column.

In general, it has been found that good results can be obtained in the recycle mode of operation when the column is supplied with from about 0.01 to 0.1 pound mole of the condensate for each pound mole of feed gases supplied to the demethanization column. When using the intermediate reflux method, there will typically be removed from the column, for refrigeration and return thereto, about 5 to 10 percent by volume of the gases passing upwardly through the column at the point of withdrawal.

DESCRIPTION OF THE PREFERRED EMBODIMENTS

Figure 1:
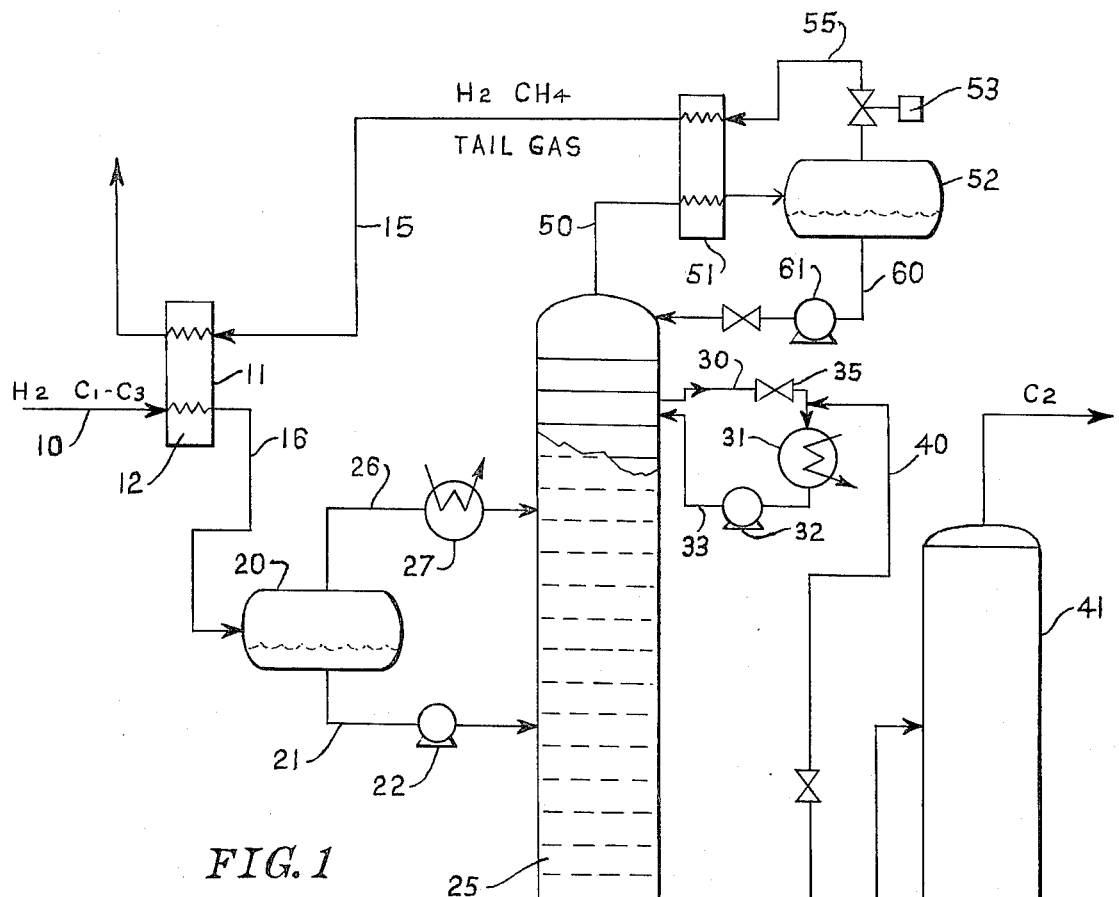
Figure 2:
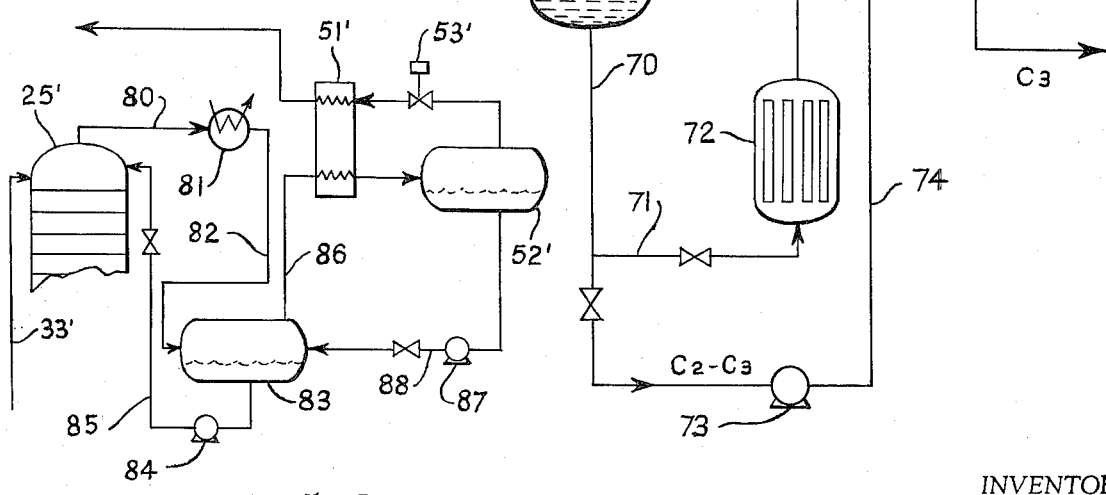

The invention can be clearly understood by reference to the appended drawing which, in FIG. 1, presents a diagrammatic illustration of a process flow suitable for the practice of the invention in connection with the use of a distillation column for removing methane and hydrogen gases overhead from a feed stream which also contains ethylene and higher boiling hydrocarbons. FIG. 2 is a modification of the flow scheme shown in FIG. 1. In the drawing, which is somewhat schematic in nature, no attempt is made to indicate all the pumps, valves and instrumentation for pressure, temperature and liquid level control and the like since the use and location thereof can readily be supplied by those skilled in the art in the light of the present teachings.

Referring to the drawing, there is shown in FIG. 1 a demethanization system wherein a feed stream containing hydrogen, methane, ethylene and various other $C_2$, $C_3$ and possibly higher hydrocarbons is supplied at high pressures, typically 450 psig, through a heat exchanger 11 provided with a liquid heat exchange medium 12. Cooling is provided to the heat exchanger 11 by means of the effluent tail gas stream, now at reduced pressures, leaving the system through line 15. The chilled feed gases pass via line 16 into a vapor-liquid separation drum 20 from which the condensate is removed through line 21 and pumped into a mid portion of a distillation column 25. The vapors taken overhead from drum 20 pass through line 26 and a heat exchanger 27, provided with an external refrigerant, for introduction into a higher portion of the column.

Column 25 is shown as being provided with 22 plates, and provision is made between plates 2 and 3, as measured from the top of the column, to introduce either an intermediate reflux condensate stream or a propane-propylene reflux condensate, it also lying within the purview of this invention to provide the column with both types of condensate, if desired.

When intermediate reflux condensate is to be used, vapors are withdrawn from the column through line 30 and passed through a heat exchanger 31 supplied with an external refrigerant such as liquid ethylene at $-145°$ to $-160°$ F. The resulting condensate is returned to the column adjacent its point of withdrawal, by pump 32 through line 33. When the condensate is to be supplied as a hydrocarbon recycle stream, valve 35 is closed and a stream of mixed propane and propylene in line 40, recovered as bottoms from a column 41, is passed through heat exchanger 31 and line 33 into the demethanization column 25. In either case, a temperature of approximately $-135°$ to $-150°$ F. is established in the liquid lying above the third plate.

The overhead vapor from column 25 is passed through line 50 into a heat exchanger 51 of the type shown at 11, where it is brought to temperatures of approximately $-160°$ to $-180°$ F. before passing into the vapor-liquid separation drum 52. This cooling of the line 50 overhead from the column is effected by passing the vapors from drum 52 through a pressure reducing valve 53, whereby a temperature of approximately $-210°$ F. is established in the tail gas stream in line 55. The tail gases leaving the heat exchanger 51, now at approximately $-160°$ to $-180°$ F. are then passed through line 15 and heat exchanger 11, as noted above, to cool the incoming feed gases in line 10. The condensate from drum 52 is returned to the top of column 25 through line 60 and pump 61, the effect of this cold, external reflux stream being to provide a temperature of approximately $-150°$ to $-170°$ F. above the top plate in the column and in the overhead gases.

The ethylene and other hydrocarbons boiling above methane are removed in liquid form from the bottom of column 25 through line 70. A portion of this liquid is returned to the column through line 71 and reboiler 72, while the balance of the bottom stream is passed through pump 73 and line 74 into a midportion of a column 41 which serves to separate an overhead C₂ stream from a bottoms C₃ stream. As has been indicated above, a portion of the C₃ bottoms can be recycled to column 25 as it is pumped through pump 76 and line 40 to the heat exchanger 31.

While not indicated in the drawing, the C₂ stream from column 41 would then be passed to another distillation column for separation of the ethylene from the ethane, while the C₃ bottoms could, if desired, be further fractionated so as to separate propylene from propane, along with any C₄ or even C₅ hydrocarbon components which might have been introduced into the system.

In FIG. 2 of the drawing there is shown a modification of the flow scheme presented in FIG. 1 wherein the vaporous effluent from column 25' is passed via line 80 into a heat exchanger 81 and thence through line 82 into a vapor-liquid separating drum 83. Condensate from this drum is passed through pump 84 and line 85 back into the column, while the vaporous overhead stream is passed through line 86 and heat exchanger 51' for cooling to a very low temperature before being passed into the second vapor-liquid separating drum 52'. The condensate from that drum is then passed by pump 87 and line 88 back to the drum 83, while the overhead, tail gas stream is passed through the pressure reducing valve 53'. the extremely cold stream so produced then passes through the heat exchanger 51'. The highly refrigerated condensate stream of the present invention is here shown as being introduced via line 33' at the top plate in column 25, it being apparent that drum 83 serves as the equivalent of a top plate in this arrangement.

We claim:

1. In a method for removing methane and hydrogen from a feed stream containing said materials along with ethylene and higher boiling hydrocarbons, wherein the feed stream is introduced, at one or more points, into the midsection of a distillation column provided with a large number of plates and operating at high pressures, wherein hydrogen and methane, along with some ethylene, are removed as a vaporous column overhead while the balance of the ethylene, along with the higher boiling components of the feed stream, are removed from lower portions of the column, the improved method of operation leading to decreased losses of ethylene in the column overhead which comprises introducing highly refrigerated condensate into an upper section of the column below the top plate thereof to establish a condensation zone in the column having temperatures of from about −135° to −150° F.; chilling the overhead to temperatures below those prevailing in said condensation zone and at the top of the column, and passing the resulting chilled stream to a liquid-vapor separation drum; reducing the pressure of the hydrogen and methane tail gas stream withdrawn from said drum to bring the stream to extremely low temperatures, and passing said resulting low temperature tail gas stream in heat exchange relationship with the column overhead gases to effect the aforesaid chilling thereof; and recycling condensed liquid from the separation drum to the top of the column to establish a temperature on the top plate which is lower than that established in the said condensation zone, the liquid so recycled to the top plate being at a temperature which is lower than that established on said plate, said refrigerated condensate introduced below the top plate being a recycle solvent stream of material selected from the group consisting of propane and mixtures of propane and propylene.

* * * * *